US008201226B2

(12) United States Patent
Duffie, III

(10) Patent No.: US 8,201,226 B2
(45) Date of Patent: Jun. 12, 2012

(54) AUTHORIZING NETWORK ACCESS BASED ON COMPLETED EDUCATIONAL TASK

(75) Inventor: John Brawner Duffie, III, Cary, NC (US)

(73) Assignee: Cisco Technology, Inc., San Jose, CA (US)

(*) Notice: Subject to any disclaimer, the term of this patent is extended or adjusted under 35 U.S.C. 154(b) by 1061 days.

(21) Appl. No.: 11/857,583

(22) Filed: Sep. 19, 2007

(65) Prior Publication Data

US 2009/0077636 A1    Mar. 19, 2009

(51) Int. Cl.
*G06F 21/00* (2006.01)

(52) U.S. Cl. ............ 726/5; 726/2; 726/3; 726/4; 726/17; 726/18; 713/168; 713/170; 340/5.1; 340/5.2

(58) Field of Classification Search .................. 726/2–5, 726/17–18; 713/168, 170; 340/5.1, 5.2
See application file for complete search history.

(56) References Cited

U.S. PATENT DOCUMENTS

| | | | | |
|---|---|---|---|---|
| 6,446,206 | B1* | 9/2002 | Feldbaum .................. | 713/175 |
| 7,194,761 | B1* | 3/2007 | Champagne .................. | 726/6 |
| 7,752,161 | B2* | 7/2010 | Watanave et al. ............ | 707/781 |
| 2002/0120866 | A1 | 8/2002 | Mitchell et al. | |
| 2003/0180694 | A1* | 9/2003 | Kienzle et al. ................ | 434/118 |
| 2004/0030895 | A1* | 2/2004 | Tachikawa .................... | 713/168 |
| 2004/0268154 | A1* | 12/2004 | Ullrich .......................... | 713/202 |
| 2005/0177724 | A1* | 8/2005 | Ali et al. ........................ | 713/168 |
| 2007/0169171 | A1* | 7/2007 | Kumar et al. .................. | 726/2 |
| 2008/0028453 | A1* | 1/2008 | Nguyen et al. .................... | 726/9 |
| 2008/0148351 | A1* | 6/2008 | Bhatia et al. ...................... | 726/2 |
| 2008/0228746 | A1* | 9/2008 | Markus et al. .................... | 707/5 |

OTHER PUBLICATIONS

"Hotspot (Wi-Fi)", [online], Aug. 1, 2007 [retrieved on Aug. 3, 2007]. Wikipedia. Retrieved from the Internet: <URL: http://en.wikipedia.org/w/index.php?title=Hotspot_%28Wi-Fi%29&printable=yes>, pp. 1-4.
"Wi-Fi", [online], Aug. 3, 2007 [retrieved on Aug. 3, 2007]. Wikipedia. Retrieved from the Internet: <URL: http://en.wikipedia.org/w/index.php?title=Wi-Fi&printable=yes>, pp. 1-6.

* cited by examiner

*Primary Examiner* — Kambiz Zand
*Assistant Examiner* — Tongoc Tran
(74) *Attorney, Agent, or Firm* — Leon R. Turkevich

(57) ABSTRACT

In one embodiment, a method comprises authentication a user of a client device by a network access device; selectively sending an education assignment request to an authorization server, by the network access device, in response to receiving a request from a client device for access to a network and based on determining the user requires educational authorization to access the network, the education assignment request including an identifier for identifying the user; forwarding to the client device an educational assignment received from the authorization server for completion by the user of the client device; forwarding to the authorization server a response to the educational assignment and having been received from the client device; and selectively authorizing, by the network access device, the access to the network by the client device based on a received authorization message from the authorization server relative to the response to the educational assignment.

20 Claims, 3 Drawing Sheets

AUTHORIZING NETWORK ACCESS BASED ON COMPLETED EDUCATIONAL TASK

TECHNICAL FIELD

The present disclosure generally relates to selectively authorizing network access (e.g., Internet access), to a client device.

BACKGROUND

Internet access by a client device typically requires a user of a client device (e.g., wired or wireless computer, web-enabled cellphone, personal digital assistant, etc.) to enter into a prescribed fee arrangement with a service provider, and/or satisfy a prescribed set of security parameters. For example, users of client devices can enter into service agreements with service providers (e.g., Internet service providers, cellphone service providers, etc.) based on establishing an account with the service provider. Wireless access (e.g., "Wi-Fi") to a wide area network (e.g., an intranet or the Internet) by a client device also can require manual configuration of the client device according to wireless settings in a wireless access device providing network access to the wide area network. For example, prescribed security settings within a wireless access point or wireless router at a private site (e.g., a subscriber home or a subscriber's office) can require a client device to be configured to provide required security keys to the wireless access point or wireless router according to a prescribed security protocol, for example the IEEE 802.11 based Wired Equivalent Privacy (WEP) or Wi-Fi Protected Access (WPA) or WPA2 wireless security protocols. Network administrators at a public or private site also can require a user to supply an authorized user name and password to gain authorized access to the network.

Network access providers at public venues can offer wired or wireless network access to an intranet or a wide area network such as the Internet (e.g., "Hotspots") based on a user of the client device registering with the network access provider. Examples of the client device registering with the network access provider can include establishing a new account based on established credit (i.e., a credit account), purchasing a prepaid account, logging in using an authorized user name and password associated with the credit account or prepaid account, or accepting location-based content or advertising as a condition for network access. Such registration can be implemented, for example, based on an access device redirecting all browser requests to a remote server requires authorization of the client device registration.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
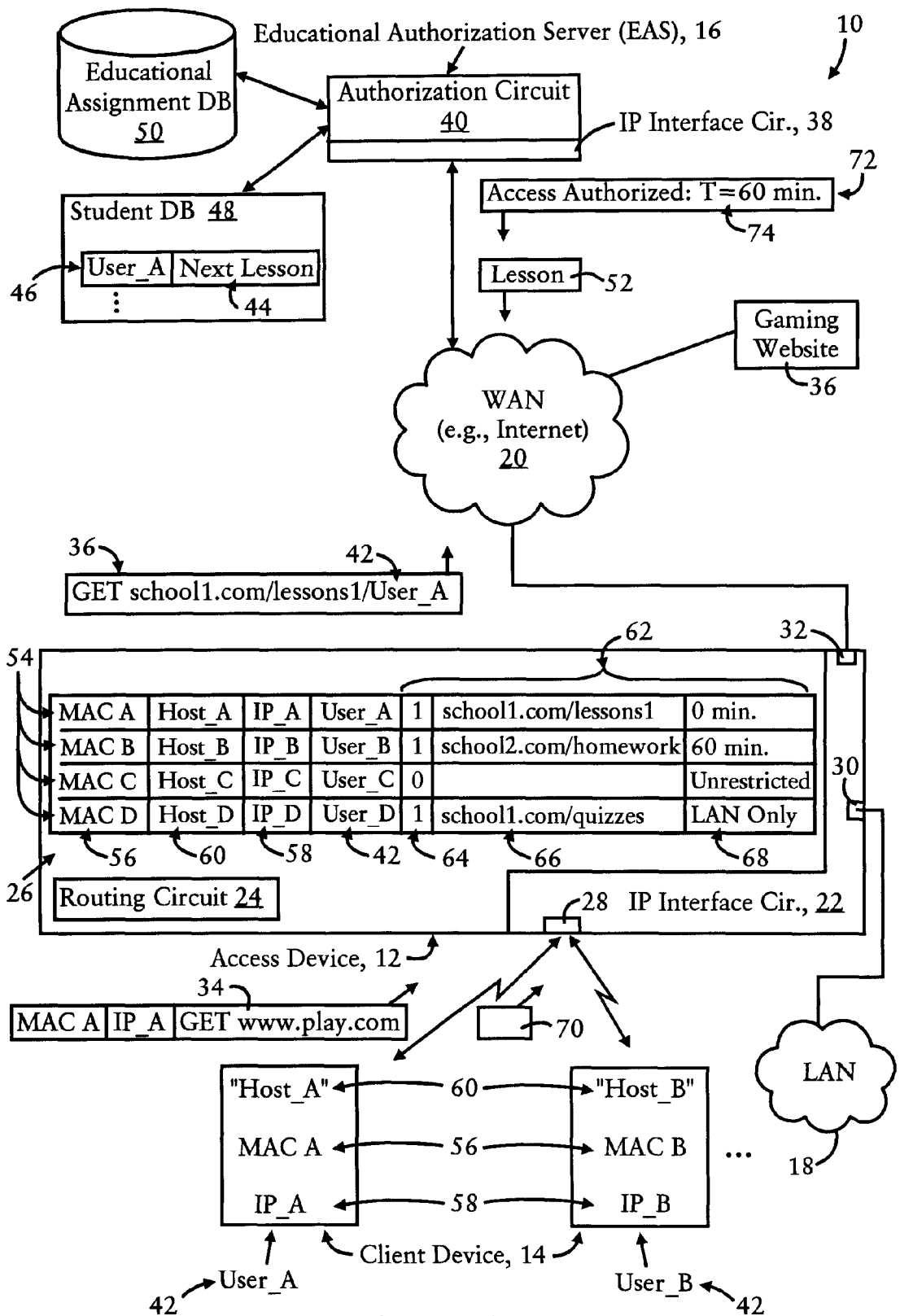
FIG. 1 illustrates an example system having an access device requiring a client device to receive authorization from an educational authorization server before accessing a network, based on a user of the client device completing an educational assignment, according to an example embodiment.

In one embodiment, a method comprises authenticating a user of a client device by a network access device; selectively sending an education assignment request to an authorization server, by the network access device, in response to the network access device receiving a request from the client device for access to a network and based on the network access device determining the user requires educational authorization to access the network, the education assignment request including an identifier for identifying the user having been authenticated by the network access device; forwarding to the client device, by the network access device, an educational assignment received from the authorization server for completion by the user of the client device; forwarding to the authorization server, by the network access device, a response to the educational assignment and having been received from the client device; and selectively authorizing, by the network access device, the access to the network by the client device based on a received authorization message from the authorization server relative to the response to the educational assignment.

In another embodiment, a method comprises receiving, by an authorization server, a request including an identifier for identifying one of a user of a client device attempting access to the network or the client device; retrieving by the authorization server an educational assignment to be completed by the user based on the identifier, and forwarding the educational assignment for delivery to the client device; receiving by the authorization server a response to the educational assignment from the client device; determining by the authorization server whether the response represents a completion of the educational assignment; and selectively generating by the authorization server an authorization for the access to the network by the client device based on the determining that the response represents the completion of the educational assignment.

DETAILED DESCRIPTION

Particular embodiments can control access to a network by a user of a client device, based on requiring the user to successfully complete an educational assignment. In particular, example embodiments can cause an access device to determine whether a user having sent a request for access to a network from a client device is authorized to access the network (e.g., a wide area network such as the Internet), or whether the user is required to complete an educational assignment. In response to the access device detecting the user is required to complete an educational assignment before being granted network access, the access device requires the user to complete the educational assignment before being granted access. In one embodiment, the access device sends an education assignment request to an authorization server in order to request an educational assignment for completion by the user. The access device forwards the educational assignment from the authorization server to the client device for completion by the user of the client device, and forwards to the authorization server a response to the educational assignment having been received from the client device.

If the authorization server determines that the response represents the completion of the educational assignment, the authorization server can generate an authorization for the access to the network by the client device, for example based on outputting an authorization message specifying a prescribed time interval that the client device is authorized to access the network. In another embodiment, the access device also can include the authorization circuitry of the authorization server, enabling the access device to perform its own authorization based on determining the user of the client device has successfully completed the educational assignment.

Hence, the disclosed embodiments provide an incentive for completion of educational assignments by users prior to accessing other network services, for example game websites, music or video websites, etc. The disclosed embodiments can be implemented in consumer network access devices, for example a consumer wireless access point or wireless router, for use in residential networks. The disclosed embodiments also can be used in educational campuses, or corporate environments to assist in the training of new employees.

FIG. 1 is a diagram illustrating an example network 10 having an access device 12 configured for selectively authorizing network access by a client device 14 based on received authorization from an educational authorization server 16, according to an example embodiment. The access device 12, for example a commercially available Linksys® WRT54G Wireless-G broadband router or a commercially-available Linksys® WAP54G Wireless-G Access Point, can be modified as described herein in order to provide selective authorization to a user of a client device 14 for accessing a network (e.g., a local area network 18 or a wide area network 20) based on the user having successfully completed an educational assignment assigned by the educational authorization server 16.

The access device 12 can include an Internet protocol (IP) interface circuit 22, a routing circuit 24, and a memory circuit 26. The IP interface circuit 22 can include a wireless interface 28 configured for sending and receiving wireless data packets according to a wireless network protocol, for example IEEE 802.11. The IP interface circuit 22 also can include a wired network interface (e.g., IEEE 802.3 10/100/1000 Mbps) 30 configured for sending and receiving data packets to and from a local area network 18 according to a prescribed link layer protocol, for example "Ethernet Protocol". The IP interface circuit also can include a second wired network interface 32 configured for sending and receiving data packets to and from a wide area network 20, for example according to "Ethernet Protocol" or based on the wired network interface 32 implementing a cable or DSL modem for use in broadband cable or DSL networks. As described below, the routing circuit 24 can be configured for sending an education assignment request to the authorization server 16, and selectively authorizing access to a local area network 18 or a wide area network 20 based on a received authorization message from the authorization server 16, described below.

The educational authorization server (EAS) 16 can include an IP interface circuit 38, and an authorization circuit 40 configured for communicating with a student database 48 and an educational assignment database 50 (e.g., via internal procedure calls or via the IP interface circuit 38). As described below, the authorization circuit 40 can send an educational assignment for completion by a user, and can determine whether a response from the user represents the completion of the educational assignment. Based on a determined completion of an educational assignment, the authorization circuit 40 can selectively generate an authorization for the access to the network by the user, for example the user of the client device 14 (e.g., "Host_A") and identified as "User_A".

Any of the disclosed circuits of the access device 12 or the educational authorization server 16 (including the network interface circuits 22 or 38, the routing circuit 24, the authorization circuit 40, the memory circuit 26, and their associated components) can include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor such as a microprocessor circuit (not shown), where execution of executable code stored in an internal memory circuit of the network access device (e.g., within the memory circuit 26) 12 or the server 16 causes the corresponding processor circuit to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 28 can be implemented, for example, using a non-volatile memory such as a programmable read only memory (PROM) or an EPROM, and/or a volatile memory such as a DRAM, etc.

Further, any reference to "outputting a message", "outputting a packet", "outputting a request", "outputting a response", etc., can be implemented based on creating the message/packet in the form of a data structure and storing that data structure in a tangible memory medium in the disclosed apparatus (e.g., in a transmit buffer). Any reference to "outputting a message" or "outputting a packet" also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" can be implemented based on the disclosed apparatus detecting the electrical (or optical) transmission of the message/packet on the communications medium, and storing the detected transmission as a data structure in a tangible memory medium in the disclosed apparatus (e.g., in a receive buffer).

Figure 2A:
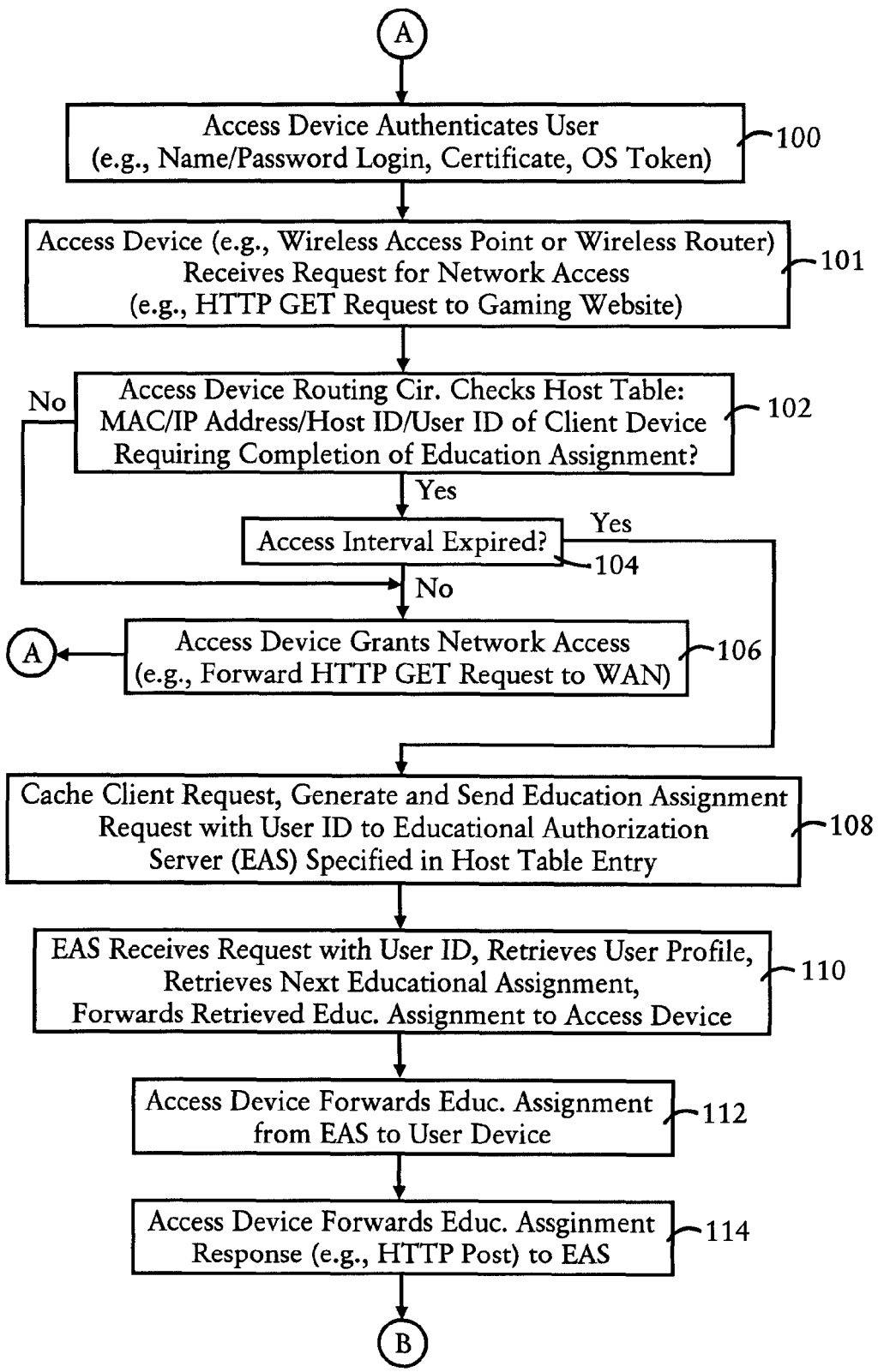
FIGS. 2A and 2B illustrate an example method by the system of FIG. 1 of authorizing a user of a client device to access a network based on user completion of an educational assignment, according to an example embodiment.
Figure 2B:
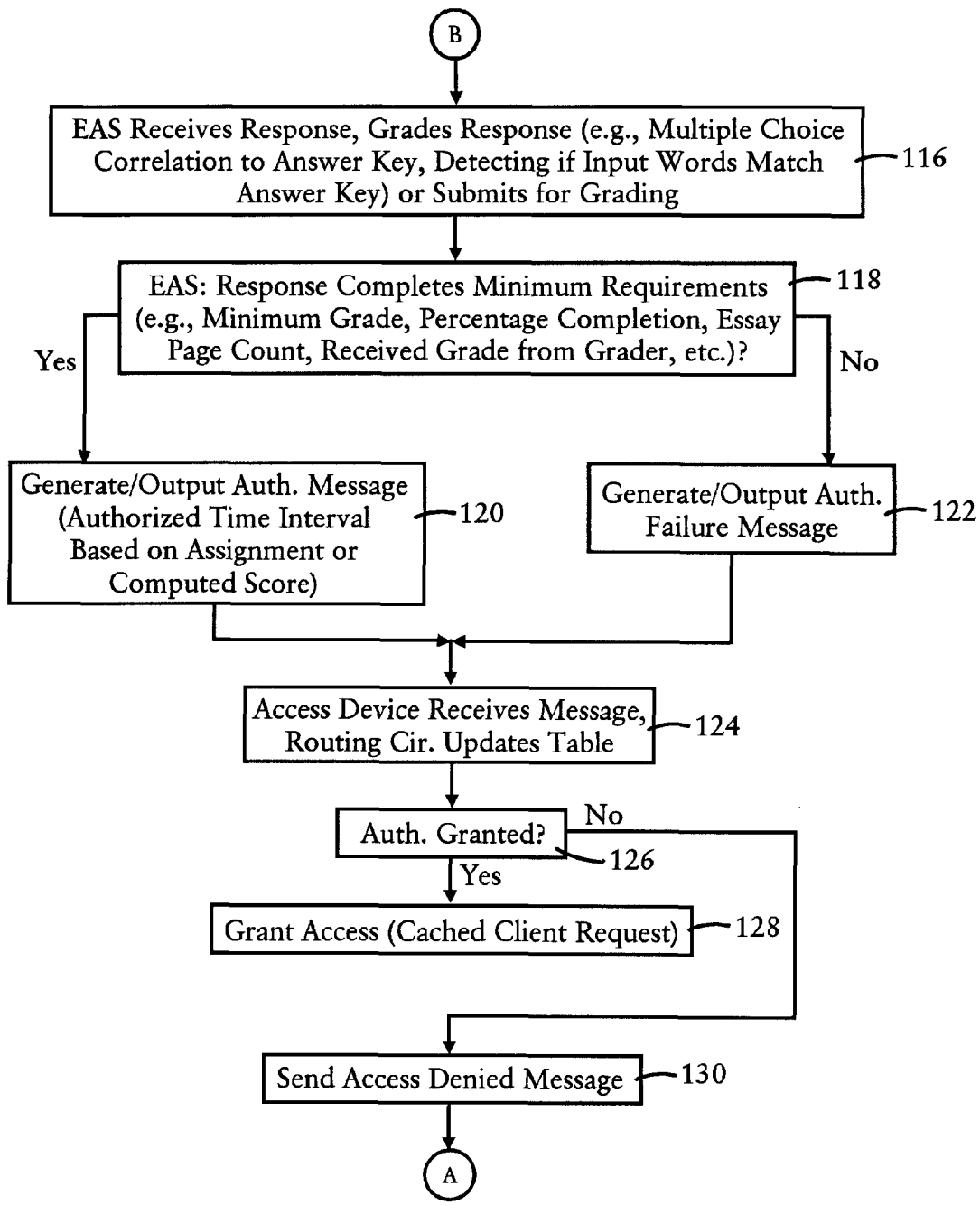

FIGS. 2A and 2B illustrate an example method by the system 10 of FIG. 1 of authorizing a user (e.g., "User_A") of a client device (e.g., "Host_A") to access a network (e.g., a local area network 18 or a wide area network 20) based on user completion of an educational assignment, according to an example embodiment. The steps described in FIGS. 2A and 2B can be implemented as executable code stored on a computer readable medium (e.g., floppy disk, hard disk, ROM, EEPROM, nonvolatile RAM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

Referring to FIG. 1, the routing circuit 24 of the access device 12 can be configured for authenticating the user 42 of the client device 14 in step 100, for example based on a prescribed user login procedure where the user 42 inputs a user name and password, where the routing circuit 24 compares the user name and password input by the user 42 with user name 42 and password information stored in a host table entry 54. Alternately, the user 42 can be authenticated in step 100 based on the user 42 supplying a digital certificate, or based on an operating system (OS) executed in the user device 42 providing some indicator (e.g., a "token") that the user 42 has successfully logged into the client device 14, in which case the routing circuit can set a user identity validation field (not shown) in the host table entry 54.

The IP interface circuit 22 of the access device 12 can be configured for receiving (step 101 of FIG. 2A) a request 34 from a client device 14 (e.g., "Host_A") for access to a network (e.g., 18 or 20), for example in the form of an HTTP GET request specifying a uniform resource locator (URL) or uniform resource identifier (URI) for a given web resource, for example a gaming website 36. As illustrated in FIG. 1, the memory circuit 26 can include host table entries 54. Each host table entry 54 can include one or more identifiers for identifying a client device 14, including for example a link layer (Media Access Control, or "MAC") address 56 assigned to the corresponding client device 14, an Internet protocol (IP) address 58 assigned to the corresponding client device 14, and/or a host identifier 60 assigned to the corresponding client device 14. Each host table entry 54 also can include a user identifier 42 for identifying the user of the device, plus educational assignment parameters 62 that identify whether the corresponding user requires authorization based on completion of an educational assignment. Example educational assignment parameters 62 include an educational assignment flag (also referred to as a "homework flag") 64, an authorization server address field 66, and an authorization status field 68. The "homework flag" 64 identifies whether authorization is required, or whether the corresponding user is permitted unrestricted access: for example, host table entry 54 for the user "User_C" is granted unrestricted access based on the "homework flag" 64 being set to "0", whereas the remaining users require completion of educational assignments, based on the respective "homework flags" 64 set to "1". The authorization status field 68 can specify whether a user is not permitted access (e.g., "User_A") to any network 18 or 20, whether a user has access for a limited time interval (e.g., "User_B"), whether a user has unrestricted access (e.g., "User_C"), and/or whether a user has only limited access to only a portion (e.g., LAN 18 only) of the network. Each host table entry 54 also can include a user password field (not shown) or a user identity validation field (not shown) that enables the routing circuit 24 to authenticate the user.

The memory circuit 26 also can include a cache circuit for storing received requests 34 that are awaiting authorization for network access. Hence, each request 34 can be stored in a cache circuit in the memory circuit 26 pending reception of the appropriate authorization message.

Hence, the routing circuit 24 can respond to a received request 34 based on retrieving the matching host table entry 54 in step 102 based on, for example, any one of the MAC address 56, the IP address 58, the host name 60, or the user name 42 specified in the request 34. If in step 102 of FIG. 2A the routing circuit 24 of the access device 12 determines that the user (e.g., "User_A") of the client device (e.g., "Host_A") 14 having sent the request 34 is required to perform an educational assignment before accessing the network 18 or 20, the routing circuit 24 can check in step 104 whether the corresponding authorization status 68 specifies that the user has any remaining access credits (e.g., number of minutes remaining for access), or whether the corresponding access interval has expired (i.e., zero minutes). If in step 104 the routing circuit 24 determines the corresponding access interval has not expired based on detecting a nonzero number of minutes, the routing circuit 24 can grant access in step 106, for example by forwarding the request onto the wide area network 20.

If in step 104 a routing circuit 24 determines that the corresponding access interval specified in the corresponding authorization status field 68 has expired, the routing circuit 24 can cache the client request 34 in the memory circuit 26, and generate and send in step 108 of FIG. 2A an education assignment request 36 via the wide area network link interface 32 to the education authorization server 16. As illustrated in FIG. 1, the education assignment request 36 specifies the identifier 42 for the corresponding user (e.g., "User_A") of the client device (e.g., "Host_A") 14 having sent the initial request 34.

The IP interface circuit 38 of the educational authorization server 16 can receive in step 110 of FIG. 2A the education assignment request 36 specifying an identifier (e.g., "User_A") 42 that identifies the user of the client device (e.g., "Host_A") 14. In response to receiving the education assignment request 36, the authorization circuit 40 can retrieve an education assignment for the user, for example based on identifying the next lesson from a lesson identifier (i.e., education assignment identifier) specified in the corresponding student entry 46 of a student database 48. The authorization circuit 40 can then retrieve in step 110 the educational assignment identified by the lesson identifier 44 from an educational assignment database 50, and forward via the IP interface circuit 38 the retrieved educational assignment 52 in step 110 back to the access device 12 for delivery to the client device 14. The educational assignment 52 can be implemented, for example, in the form of an HTML page having form inputs for the user to complete.

In response to the wide area network link interface 32 of the access device 12 receiving the educational assignment 52 from the EAS server 16 via the wide area network 20, the routing circuit 24 forwards in step 112 of FIG. 2A the educational assignment 52 to the client device (e.g., "Host_A") 14 for completion by the corresponding user, identified by the corresponding user identifier (e.g., "User_A") 42. The user of the client device (e.g., "Host_A") 14 can then send a response 70 to the EAS 16, for example as an HTTP post. In response to the IP interface circuit 22 of the access device 12 receiving the response 70, the routing circuit 24 can forward the response 70 to the EAS 16 in step 114 for evaluation.

Referring to FIG. 2B, the network interface circuit 38 of the EAS 16 can receive in step 116 the response 70 to the educational assignment 52 from the client device (e.g., "Host_A") 14. The authorization circuit 40 can determine in steps 116 and 118 whether the response 70 represents a satisfactory completion of the educational assignment. For example, the authorization circuit 40 can grade the response 70 based on correlating multiple-choice answers specified within the response 70 with a prescribed answer key retrieved by the authorization circuit 40 from the assignment database 50; alternately, the authorization circuit 40 can grade the response 70 based on identifying input words specified in the response 70 relative to prescribed keywords specified in a prescribed answer key retrieved by the authorization circuit 40 from the assignment database 50. Alternately, the authorization circuit 40 can submit the response 70 for manual grading by a teacher or teaching assistant identified as available for online grading of the responses 70. The authorization circuit 40 determines in step 118 whether the received response completes a prescribed set of minimum requirements for completing the educational assignment 52: example minimum requirements can include a minimum grade calculated by the authorization circuit 40 (e.g., a percentage of correct multiple-choice answers), a percentage completion, a number of detected words or pages for a written essay specified within the response, or a received grade from a teacher or teaching assistant having completed the online grading described above with respect to step 116.

If in step 118 the authorization circuit 40 determines that the response 70 represents a satisfactory completion of the educational assignment 52, the authorization circuit 40 can update the student database entry 46, as appropriate, and generate in step 120 an authorization message 72, illustrated in FIG. 1, that specifies a prescribed time interval (e.g., 60 minutes) 74 identifying a duration that the user should be authorized to access the network. The authorized time interval 74 can be based on a corresponding assigned time specified within the educational assignment database 50 relative to the corresponding assignment 52; alternately, the prescribed time interval 74 can be based on a computed score or grade as determined by the authorization circuit 40 in step 118. The authorization message 72 can be output by the IP interface circuit 38 in step 120 for delivery to the access device 12. However, if in step 118 the authorization circuit 40 determines that the response 70 from the client device 14 does not complete the minimum requirements for completion of the educational assignment 52, the authorization circuit 40 can generate in step 122 a message indicating authorization is not granted due to a failure to complete the assignment.

In response to the IP interface circuit 22 of the access device 12 receiving in step 124 a message from the authorization server 16 indicating results of the education assignment 52, the routing circuit 24 can update the corresponding table entry 54 based on the received message. If in step 126 the routing circuit 24 determines that authorization has been granted, for example based on the authorization status field 60 specifying a nonzero number of minutes, the routing circuit 24 can grant access in step 128 to the original client request 34, cached locally within the access device 12. Alternatively, if in step 126 the access device 12 determines that authorization was not granted by the EAS 16, the routing circuit 24 can output to the client device 14 via the IP interface circuit 22 an access denied message in step 130, which can include an offer for the user to attempt another assignment in order to obtain access to the network.

According to the example embodiments, users can be required to complete educational assignments prior to being granted access to a network. The foregoing examples can be applied not only to Internet-based web services such as gaming websites or music/video download websites, but also can be applied to usage of cell phones to call individuals based on access policies (e.g., family members or supervisors always can be called, whereas persons listed on secondary lists can be called only after completion of the educational assignment). In addition, authorization can be granted based on user identity, in order to ensure that shared client devices 42 (e.g., a parent and child using the same client device) properly provide access to authorized users (e.g., the parent), while requiring unauthorized users (e.g., the child) of the same client device to obtain the educational authorization.

Although the example embodiments illustrate an access device that is distinct from the educational authorization server, the authorization circuit 40 also can be implemented within an access device at a subscriber premises. For example, an access router (e.g., the access device 12) at a subscriber premises can include the authorization circuit 40 (e.g., as part of the routing circuit 24 or distinct from the routing circuit 24) configured for performing the authorization operations described herein, based on the authorization circuit 40 within the local access router retrieving the educational assignments from an authorized educational database (e.g., a school system website), and retrieving answer keys from the authorized educational database in a secure manner. Hence, an access router at a customer premises can include the authorization circuit for localized authorization of a client device based on locally determining that the user has completed the educational assignment, stored locally or retrieved from a remote site. Hence, the example embodiments also can be applicable to educational campuses or even households having home-schooled children.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   authenticating a user of a client device by a network access device; and
   the network access device requiring the user to complete an educational assignment that is supplied to the user by the network access device prior to the user being granted access to a network, based on:
   selectively sending an education assignment request to an authorization server, by the network access device, in response to the network access device receiving a request from the client device for access to the network and based on the network access device determining the user requires educational authorization to access the network, the education assignment request including an identifier for identifying the user having been authenticated by the network access device,
   forwarding to the client device, by the network access device, the educational assignment received from the authorization server for completion by the user of the client device prior to the user being granted the access to the network, the educational assignment forwarded to the client device having not yet been successfully completed by the user,
   forwarding to the authorization server, by the network access device, a response representing an attempted completion of the educational assignment and having been received from the client device, and
   selectively authorizing, by the network access device, the access to the network by the client device based on a received authorization message from the authorization server relative to the response to the educational assignment, the received authorization message representing the educational authorization, the educational authorization granted to the user by the authorization server based on the user having successfully completed the educational assignment.

2. The method of claim 1, wherein the received authorization message identifies a prescribed authorized time interval for the access to the network by the client device, the selectively authorizing including granting access to the network by the client device until expiration of the prescribed authorized time interval.

3. The method of claim 1, wherein the selectively authorizing includes blocking the access to the network by the client device based on a received authorization failure message from the authorization server relative to the response to the educational assignment.

4. The method of claim 1, wherein the identifier is any one of a media access control (MAC) address or a host name assigned to the client device or a user identifier assigned to the user of the client device, the sending including generating the education assignment request in response to detecting a table entry, within the network access device, specifying authorization required by the authorization server prior the access to the network by the client device.

5. The method of claim 1, wherein the network is a wide area network, the selectively authorizing including updating a table entry that includes an authorization status for the user from one of no access or local area network (LAN) only access, to access to the wide area network.

6. The method of claim 1, further comprising storing the request in a memory circuit pending reception of the received authorization message, the selectively authorizing including outputting the request stored in the memory circuit to the network.

7. A method comprising:
receiving, by an authorization server, a request including an identifier for identifying one of a user of a client device attempting access to a network or the client device;
retrieving by the authorization server, based on the identifier, an educational assignment required to be completed by the user prior to the user being granted the access to the network, and forwarding the educational assignment for delivery to the client device, the educational assignment having not yet been successfully completed by the user;
receiving by the authorization server a response representing an attempted completion of the educational assignment from the client device;
determining by the authorization server whether the response represents a successful completion of the educational assignment by the user; and
selectively generating by the authorization server an authorization for the access to the network by the client device based on the determining that the response represents the successful completion of the educational assignment.

8. The method of claim 7, wherein the selectively generating includes assigning a prescribed time interval for the access to the network by the client device, based on the at least one of the prescribed time interval being assigned to the educational assignment, or based on a computed score that identifies a relative completion of the educational assignment.

9. The method of claim 7, wherein the receiving of the request includes receiving the request from an access device, the identifier identifying the user, the method further comprising outputting the authorization by the authorization server to the access device, the authorization specifying a prescribed time interval for the access to the network by the network device.

10. The method of claim 7, further comprising grading the score by the authorization server based on one of correlating multiple-choice answers specified within the response relative to an answer key, or identifying input words specified within the response relative to the answer key.

11. An apparatus comprising:
a network interface circuit configured for receiving a request from a client device for access to a network by a user of the client device; and
a routing circuit configured for authenticating the user, the routing circuit further configured for requiring the user to complete an educational assignment that is supplied to the user by the apparatus prior to the user being granted access to the network, based on selectively generating, in response to the request from the client device, an education assignment request for output by the network interface circuit to an authorization server based on the routing circuit determining the user requires educational authorization to access the network, the education assignment request including an identifier for identifying a user of the client device, the routing circuit further configured for:
forwarding to the client device an educational assignment received from the authorization server, for completion by the user prior to the user being granted the access to the network, the educational assignment forwarded to the client device having not yet been successfully completed by the user;
forwarding to the authorization server a response representing an attempted completion of the educational assignment and having been received from the client device; and
selectively authorizing the access to the network by the client device based on a received authorization message from the authorization server relative to the response to the educational assignment, the received authorization message representing the educational authorization, the educational authorization granted to the user by the authorization server based on the user having successfully completed the educational assignment.

12. The apparatus of claim 11, wherein the received authorization message identifies a prescribed authorized time interval for the access to the network by the client device, the routing circuit configured for granting access to the network by the client device until expiration of the prescribed authorized time interval.

13. The apparatus of claim 11, wherein the routing circuit is configured for blocking the access to the network by the client device based on a received authorization failure message from the authorization server relative to the response to the educational assignment.

14. The apparatus of claim 11, further comprising a table entry that specifies the identifier, a second identifier identifying the authorization server, and an authorization status identifying one of no authorized access to the network has been granted to the client device associated with the identifier, access by the client device associated with the identifier limited to a portion of the network, or an authorization expiration time based on a prescribed authorized time interval specified in the authorization message.

15. The apparatus of claim 11, wherein the routing circuit is configured for generating the education assignment request in response to detecting that authorization is required by the authorization server prior the access to the network by the client device.

16. The apparatus of claim 11, further comprising a memory circuit configured for caching the request pending reception of the received authorization message, the routing circuit configured for selectively outputting the request stored in the memory circuit to the network in response to the received authorization message.

17. An apparatus comprising:
a network interface circuit configured for receiving a request, the request including an identifier for identifying one of a user of a client device attempting access to a network, or the client device; and
an authorization circuit configured for retrieving, based on the identifier, an educational assignment required to be completed by the user prior to the user being granted the access to the network, the authorization circuit configured for forwarding the educational assignment for delivery via the network interface circuit to the client device, the educational assignment having not yet been successfully completed by the user;

the network interface circuit configured for receiving a response to the educational assignment from the client device;

the authorization circuit further configured for determining whether the response represents a successful completion of the educational assignment by the user, and selectively generating an authorization for the access to the network by the client device based on the determining that the response represents the successful completion of the educational assignment.

18. The apparatus of claim 17, wherein the authorization circuit is configured for assigning a prescribed time interval for the access to the network by the client device, based on the at least one of the prescribed time interval being assigned to the educational assignment, or based on a computed score that identifies a relative completion of the educational assignment.

19. The apparatus of claim 17, wherein the network interface circuit is configured for receiving the request from an access device, the identifier identifying the user, the authorization circuit configured for generating an authorization message for output by the network interface circuit to the access device, the authorization message specifying a prescribed time interval for the access to the network by the network device.

20. The apparatus of claim 17, wherein the authorization circuit is configured for grading the score based on one of correlating multiple-choice answers specified within the response relative to an answer key retrieved by the authorization circuit, or identifying input words specified within the response relative to the answer key.

* * * * *